2,939,844
PREPARATION OF A CATALYST FOR THE REACTION BETWEEN ACETYLENE AND FORMALDEHYDE TO FORM 2-BUTYNE-1:4-DIOL

Leo Philipp Ellinger, London, England, assignor to The British Oxygen Company Limited, a company of Great Britain No Drawing. Filed Apr. 1, 1957, Ser. No. 649,602

5 Claims. (Cl. 252—428)

The present invention relates to the reaction between acetylene and formaldehyde to form 2-butyne-1:4-diol, and catalysts therefor.

2-butyne-1:4-diol (hereinafter referred to as butynediol) is usually prepared by reacting acetylene with an aqueous solution of formaldehyde in the presence of a catalyst consisting essentially of copper acetylide. The catalyst can be prepared by reacting an aqueous solution of a copper salt with acetylene under appropriate conditions, removing the precipitated copper acetylide, and transferring it to the vessel in which the acetylene and the formaldehyde are to be reacted. This procedure may give rise to difficulties in handling the free copper acetylide (which can decompose explosively when dry) and, moreover, it has been found that the catalyst particles are liable to attrition during the course of reaction, so that difficulties arise in separating the catalyst and the product liquor.

To obtain a more robust catalyst, it has been proposed to support the catalyst on a porous solid medium, the procedure being to deposit the copper salt on the support and to convert it to copper acetylide in situ. A preferred support has been silica gel, and in order to obtain a satisfactory catalyst, it has been necessary for the catalyst support to be specially prepared. Catalysts have been decribed in which the amount of copper held on the support was 10–12% by weight.

It is an object of the present invention to provide a catalyst much richer in copper than such silica gel-supported catalysts, but which is nevertheless robust and free from the disadvantages of the unsupported catalyst.

It is a further object of the invention to provide a simplified procedure for the preparation of such a catalyst.

Yet a further object of the invention is to provide a catayst which is more efficient on overall considerations.

A further object of the invention is to provide an improved process for the preparation of butynediol.

According to one aspect of the present invention, a process for the preparations of a catalyst capable of catalysing the reaction between acetylene and formaldehyde to form 2-butyne-1:4-diol comprises treating with acetylene in the presence of formaldehyde a copper silicate or basic copper silicate material containing 15–60% by weight of copper. The copper silicate material containing 15–60% by weight of copper, may be made by mixing the requisite proportions of a solution of a copper salt and a solution of an alkali metal silicate, the copper silicate material being subsequently converted to the catalysts by treatment with acetylene in the presence of formaldehyde. Similarly, the basic copper silicate material may be made by replacing part of the alkali metal silicate solution by a solution of sodium, potassium, or ammonium hydroxide.

The copper silicate or basic copper silicate precipitate may be separated, washed, and dried by heating in air to temperatures up to 300° C. or above, or by warming to only slightly elevated temperatures under reduced pressure. On drying, it forms cakes which can readily be broken into granules, but the invention is not limited to the use of such material. For example, the material may be extruded into rods or converted into other suitable forms. It can, if desired, be mixed with inert materials such as kaolin, and then pelleted. If the material is heated above about 100° C. in the drying process, its colour may change from light blue to black, but catalysts can be prepared from either the blue or the black material.

It is possible, if desired, to impregnate the copper silicate or basic copper silicate material with further amounts of copper by immersion in a solution of a copper salt and subsequent ignition. In this way, the copper content of the final material can be raised to 60% or more, but this is not essential for the preparation of a useful catalyst.

It is possible to convert the precipitated copper silicate or basic copper silicate into a copper acetylide catalyst without prior separation from its mother liquor, but this is not a preferred method of operating the process of my invention.

It is sometimes considered desirable to incorporate in the catalyst for the reaction between acetylene and formaldehyde other materials, generally described as "cuprene inhibitors." A particularly useful example of such inhibitors is bismuth. When copper sillicate material is used in carrying out the process of the present invention it is possible to incorporate bismuth or other such inhibitors in the catalyst, either during the first stage of precipitating the copper silicate material or by immersing the dry copper silicate granules in an appropriate solution. It has, however, been found that cuprene formation is greatly reduced when catalysts prepared in accordance with the present invention are used as compared with unsupported or silica gel-supported catalysts, and the use of such cuprene inhibitors is accordingly unnecessary. When the basic copper silicate is used as starting material, cuprene formation is almost negligible.

The copper silicate or basic copper silicate material may be converted into the actual catalyst used in the reaction by adding it to aqueous formaldehyde which is warmed above 60° C. and feeding acetylene to it. The conversion may conveniently be carried out in situ in the reactor. The catalyst so prepared is robust. In batch processes in which the catalyst is suspended in aqueous formaldehyde and the latter reacted with acetylene under pressure, the product liquor subsequently being separated from the catalyst which is then re-used, the catalysts of the present invention can be used repeatedly for a large number of sucessive operations. The separation of product liquor and catalyst remains facile even after much repeated use of the same batch of catalyst. In continuous operation in which aqueous formaldehyde and acetylene are each flowed through a bed of catalyst, catalysts prepared according to the present invention are much less subject to attrition, to dislodgement of copper acetylide, or to blockages causing resistance to flow than are either unsupported copper acetylide or copper acetylide supported on pre-prepared supports.

It is a further advantage of catalysts prepared in accordance with the present invention that a given amount of such a catalyst is capable of catalysing the reaction between acetylene and formaldehyde to a greater extent than the same amount of supported catalyst.

A preferred method of carrying out the reaction between acetylene and formaldehyde using the catalyst of the present invention comprises suspending the catalyst in formaldehyde solution and maintaining it in suspension by passing through the solution acetylene or an acetylene containing gas under super-atmospheric pressure, the product being subsequently separated from the catalyst by filtration or centrifugation. As mentioned above, cuprene formation is almost negligible when using the catalyst of the present invention and is insufficient to interfere with the rapid filtration of the reaction product. The catalyst bed is readily re-suspended in a fresh charge of aqueous formaldehyde and the process can be repeated many times.

It is a further advantage of the process operated in this manner that the acetylene or acetylene inert gas mixtures leaving the reaction zone carries with it substantial quantities of water vapour, propargyl alcohol and some formaldehyde, removing thereby a substantial proportion of the heat liberated during the reaction. It is thus possible by controlling the rate of circulation of acetylene to control the temperature level in the reaction vessel.

It is also an advantage that the process takes place in suspension, which is maintained by gas circulation; uniform temperature distribution is thereby readily achieved and maintained during the whole operation.

In a preferred method of operation the acetylene leaving the reactor is cooled in order to effect separation of water and propargyl alcohol and formaldehyde by condensation. The separated liquid may be either returned to the reactor or collected separately, or preferably returned at the early stage of operation and subsequently held separately for incorporation with the feed of a succeeding batch, as in this manner a purer reaction product is obtained.

While excellent results have been obtained when the acetylene is used under a pressure of 20 atmospheres, it is not essential to operate at this particular pressure. The reaction has been successfully carried out using other pressures within the range 5 to 30 atm.

The invention is illustrated by the following examples:

Example 1

An aqueous solution containing 140 g. of copper nitrate ($Cu(NO_3)_2 3H_2O$) was added to an excess of an aqueous solution of water glass (30% $Na_2Si_4O_9$) with stirring and the precipitate was filtered, washed with distilled water and dried at 80° C. The product contained 23.5% by weight of copper. It was heated to 220° C., cooled and immersed for 20 minutes in an aqueous solution containing 305 g. per litre of copper nitrate and 46 g. per litre of bismuth nitrate ($Bi(NO_3)_3 5H_2O$). The product was filtered, dried at 220° C. and roasted at 500° C. until it no longer fumed. 150 g. of a black powder containing 41.2% by weight of copper and 11.7% by weight of bismuth were obtained.

125 g. of the black powder prepared as above were placed in a 1 litre autoclave together with 540 g. of a 42.6% (by weight) solution of formaldehyde. After purging with nitrogen, acetylene was admitted at 20 atm. and 80° C. and during ½ hour, while the acetylide catalyst was formed, the temperature was raised to 100° C. Acetylene absorption ceased after 7 hours. During this period, 126 g. of acetylene was absorbed.

The product was filtered from the catalyst. It was found to contain 41.6% by weight of butynediol, 10.1% of propargyl alcohol and 0.5% of formaldehyde.

The same catalyst was re-used, using 240 g. of paraformaldehyde, 200 g. of water and acetylene at 20 atm. and 100° C. During 5 hours 110 g. of acetylene was absorbed. The product was filtered and the resulting solution contained 300 g. of butynediol (56.8% by weight), 31 g. of propargyl alcohol (6%), and 3.5 g. of formaldehyde (0.7%). The yield of butynediol on formaldehyde was 91% and that of propargyl alcohol 7%.

This procedure was repeated nine times without any slowing of the reaction, deterioration in the quality of the product, or excessive difficulty in the filtration of the reaction product from the catalyst.

Example 2

Aqueous solutions of 30% water glass (1.73 kg.) and of copper nitrate (363 g.) were mixed and the resulting precipitate washed and roasted at 220° C. The product contained 55.2% of copper.

65 g. of this material was used in the preparation of the acetylide and a similar procedure was followed to that of Example 1. Almost identical results were obtained.

Example 3

Copper silicate was prepared as in Example 2, but instead of the roasting at 220° C., it was heated at 120° C. for 8 hours before being used in the acetylene-formaldehyde reaction. In operation, this catalyst gave results substantially similar to those of Example 1.

Example 4

An aqueous solution of copper nitrate containing 2.03 kg. of $Cu(NO_3)_2.3H_2O$ and 5.46 l. of deionised water was added to a solution of 764 g. of water glass ($Na_2O$, 17.1% and $SiO_2$, 36.3%) and of 277 g. of sodium hydroxide in 4.2 l. of deionised water with stirring and maintained at a temperature of 40–50° C. for 90 minutes. The product was then filtered and resuspended in dilute aqueous caustic soda (8.4 l., 0.3%). The product was filtered again and resuspended in a similar quantity of water (8.4 l.). After filtration and drying at 100° C. in vacuo the product was roasted at 300° C. until no fumes appeared. The product was a black powder (945 g.) and contained 49.1% of copper.

825 g. of the black powder prepared as above was placed in an autoclave together with 8000 g. of a 27% (by weight) solution of formaldehyde. After venting with nitrogen, acetylene was admitted at 20 atm. at 90° C., and while the acetylide catalyst was being formed the temperature was raised to 100–105° C. Acetylene absorption ceased after 8 hours.

The product was filtered from the catalyst. It was found to contain 27.6% of butynediol and 6% of propargyl alcohol.

The same catalyst was reused, using 8150 g. of 37% solution of formaldehyde. During 4.5 hours 1420 g. of acetylene was absorbed. The product was filtered and contained 3940 g. of butynediol (39.2%), 430 g. of propargyl alcohol (4.3%) and 33 g. of formaldehyde (0.3%). The yield of butynediol on the formaldehyde was 92.2% and that of propargyl alcohol 7.6%.

The procedure was repeated nine times under similar conditions without deterioration of the catalyst.

Example 5

To a stirred aqueous solution of copper nitrate ($Cu(NO_3)_2$, $3H_2O$, 241.5 g. in 680 ml. of water) was added a solution of water glass ($Na_2O$, 17.1%; $SiO_2$, 36.3%, 181 g.) and of caustic soda (22 g.) in water (500 g.). The product was washed with dilute aqueous caustic soda and repeatedly with water and was dried at 300° C. The prdouct was a blue-grey powder containing 34.7% of copper.

This material was suspended in aqueous formaldehyde and treated with acetylene in the same way as described for the black powder in Example 4. The production of butynediol was very closely similar to that described in Example 4.

Example 6

An aqueous solution containing 2.25 kg. of copper nitrate ($Cu(NO_3)_2$, $3H_2O$) was added to an excess of an aqueous solution of water glass (30% $Na_2Si_4O_9$) with stirring, and the precipitate was filtered, washed with water and dried first at 100° C. and finally at 220° C.

The reactor for the preparation of butynediol comprised a 20 litre stainless steel pressure vessel. This was fitted at the base with a gas inlet tube and gas distributor. It was also fitted close to the base with a tubular filter element of porous stainless steel through which the reaction product was filtered. The gas leaving the reactor was passed through a water cooled condenser. The condensate separated into a catchpot in which it could either be held or from which it could be returned to the reactor. The gas leaving the catchpot passed through a flash-back arrestor to a circulating compressor, operating in the range 2–20 l./min. of compressed gas, which returned the gas to the reactor. Fresh acetylene or acetylene inert gas mixture compressed to the operational pressure was also available as required.

1 kg. of the copper silicate powder prepared as described above, 7.96 kg. of a 36.9% aqueous solution of formaldehyde, and 50 g. of sodium bicarbonate were charged into the reactor. After venting with nitrogen, acetylene was admitted at 20 atm. and 80° C. and the temperature was raised to 105° C. during ½ hour. The temperature was maintained at 105–110° C. for 12 hours, fresh acetylene being admitted so as to maintain the pressure of 18–20 atm. The recycle gas rate was 5–6 l./min. of compressed gas. Recycle gas condensate was returned from the catchpot to the reactor during the first part of the preparation, and was collected in the catchpot during the last two hours. At the end of the reaction the pressure was lowered to 10 atm. and the product was filtered in 30 minutes.

6.83 kg. of an aqueous solution containing 26% of butynediol and 7.3% of propargyl alcohol was obtained from the reactor. 1.44 kg. of an aqueous solution containing 15.3% of propargyl alcohol and 10.9% of formaldehyde was obtained from the catchpot.

The copper acetylide catalyst prepared in the reactor during the above run, was reused, by charging to the reactor 7.95 kg. of a 33.3% aqueous solution of formaldehyde and of 50 g. of sodium bicarbonate, and 1.44 kg. of an aqueous solution containing 15.3% of propargyl alcohol and 10.9% of formaldehyde collected from the catchpot during the previous preparation. Acetylene was circulated at 18–20 atm. and 5–6 l./min. at 110–115° C. for 9.5 hours. The filtered product consisted of 7.84 kg. of an aqueous solution containing 38.4% of butynediol and 5.3% of propargyl alcohol. In addition 1.34 kg. of an aqueous solution containing 14.9% of propargyl alcohol and 4% of formaldehyde was obtained from the catchpot.

The catalyst was repeatedly reused in the manner described in the above paragraph.

*Example 7*

An aqueous solution of copper nitrate containing 2.03 kg. of Cu(NO$_3$)$_2$, 3H$_2$O and 5.46 l. of deionised water was added to a solution of 764 g. of water glass (Na$_2$O, 17.1% and SiO$_2$, 36.3%) and of 277 g. of sodium hydroxide in 4.2 l. of deionised water with stirring and maintained at 40–50° C. for 90 minutes. The product was then filtered and re-suspended in 8.4 l. of 0.3% aqueous caustic soda. The product was filtered again and re-suspended in a similar quantity of water. After filtration and drying at 100° C., the copper silicate (1145 g.) was roasted at 300° C. for 12 hours. The product (863 g.) was an almost black powder containing 50.2% of copper.

The reactor in which the copper silicate was used for the preparation of butynediol was the same as in Example 6, except that the filter element consisted of a porous ceramic tube.

775 g. of copper silicate prepared as described above 7.95 kg. of a 37.2% aqueous solution of formaldehyde, and 150 g. of sodium bicarbonate were charged into the reactor. The reaction was performed for 8 hours at 110–115° C. and at 18–20 atm. until 2.37 kg. of acetylene had been absorbed. The product was filtered during 25 minutes at 2 atm. The product was 6.4 kg. of an aqueous solution containing 37.8% of butynediol, 5.1% of propargyl alcohol and 0.7% of formaldehyde. Recycle condensate liquor was collected during the last two hours of the preparation, but it was added directly to the following preparation.

The copper acetylide prepared in the above preparation was reused in the above manner except that the reaction time was reduced to 5 hours in more than 20 preparations without deterioration of the catalyst. The propargyl alcohol contained in the reaction product was separated together with some water by fractional distillation and was added to the formaldehyde charge to subsequent preparations. Over the extended series of preparations a product containing a yield of 93% of butynediol, based on formaldehyde, and about 85% based on acetylene was obtained as a 46% aqueous solution containing also 1% of propargyl alcohol and 0.5% of formaldehyde.

This application is a continuation-in-part of my previous application Serial No. 560,292 filed January 20, 1956, now abandoned.

I claim:

1. The process for preparing a catalyst capable of catalysing the reaction between acetylene and formaldehyde to form butyne-1:4-diol which comprises the steps of preparing a material containing 15–60% by weight of copper by mixing a solution of copper nitrate, a solution of an alkali metal silicate, and a solution of a substance selected from the group consisting of sodium hydroxide, potassium hydroxide and ammonium hydroxand subsequently converting the material to the catalyst by treatment with acetylene in the presence of formaldehyde.

2. The process according to claim 1 wherein the material is suspended in an aqueous solution of formaldehyde prior to its treatment with acetylene and wherein said treatment is effected at a temperature above 60° C.

3. The process for preparing a catalyst capable of catalysing the reaction between acetylene and formaldehyde to form butyne-1:4-diol which comprises the steps of preparing a material containing 15–60% by weight of copper by mixing a solution of copper nitrate, a solution of an alkali metal silicate, and a solution of a substance selected from the group consisting of sodium hydroxide, potassium hydroxide and ammonium hydroxide, separating, washing and drying the material so prepared, and converting the dried material to the catalyst by treatment with acetylene in the presence of formaldehyde.

4. The process for preparing a catalyst capable of catalysing the reaction between acetylene and formaldehyde to form 2-butyne-1:4-diol which comprises the steps of preparing a material containing 15–60% by weight of copper by mixing a solution of copper nitrate, a solution of an alkali metal silicate, and a solution of a substance selected from the group consisting of sodium hydroxide, potassium hydroxide and ammonium hydroxide, separating, washing and drying the material, impregnating the dried material with a further amount of copper and converting the impregnated material to the catalyst by treatment with acetylene in the presence of formaldehyde.

5. A catalyst for the reaction between acetylene and formaldehyde to form 2-butyne-1:4-diol comprising supported copper acetylide made by first preparing a material containing 15–60% by weight of copper by mixing a solution of copper nitrate, a solution of an alkali metal silicate and a solution of a substance selected from the group consisting of sodium hydroxide, potassium hydroxide and ammonium hydroxide, and thereafter treating said material with acetylene in the presence of formaldehyde.

References Cited in the file of this patent

UNITED STATES PATENTS

| | | |
|---|---|---|
| 2,439,765 | Walker | Apr. 13, 1948 |
| 2,670,379 | Hadley et al. | Feb. 23, 1955 |
| 2,716,665 | Hadley et al. | Aug. 30, 1955 |
| 2,768,215 | Hecht | Oct. 23, 1956 |
| 2,783,286 | Reynolds | Feb. 26, 1957 |

OTHER REFERENCES

Ser. No. 327,820, Reppe et al. (A.P.C.), published April 20, 1943.